Figure 1:
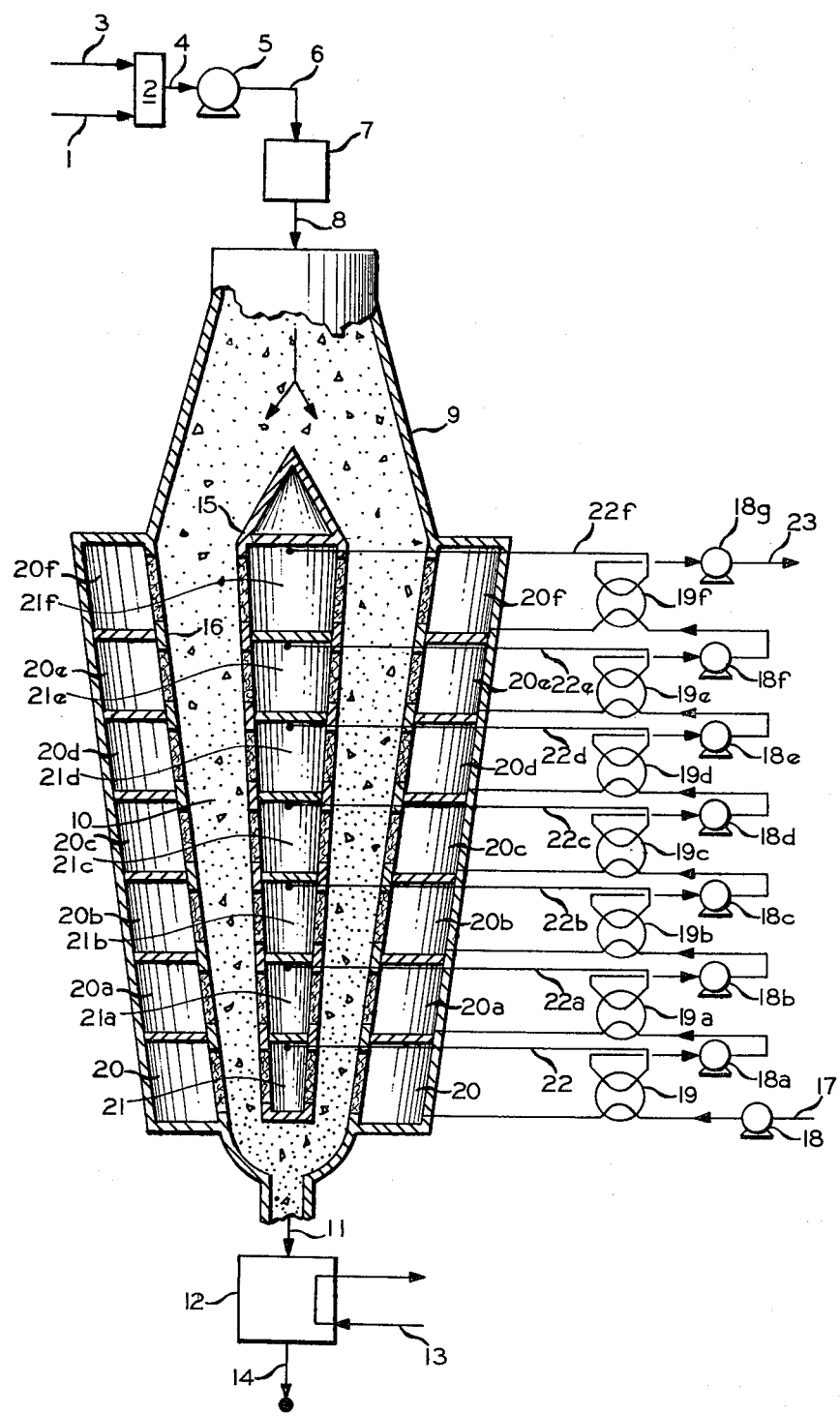

United States Patent [19]

Warzel

[11] 4,376,693

[45] Mar. 15, 1983

[54] SOLID LIQUID EXTRACTION

[75] Inventor: F. Morgan Warzel, Bartlesville, Okla.

[73] Assignee: Phillips Petroleum Company, Bartlesville, Okla.

[21] Appl. No.: 282,769

[22] Filed: Jul. 13, 1981

[51] Int. Cl.³ .............................................. C10G 1/04
[52] U.S. Cl. ........................... 208/11 LE; 208/8 LE; 422/261
[58] Field of Search ...................... 208/8 LE, 11 LE; 422/261; 423/658.5

[56] References Cited

U.S. PATENT DOCUMENTS

| | | | |
|---|---|---|---|
| 2,632,720 | 3/1953 | Perry | 422/261 X |
| 2,871,180 | 1/1959 | Lowman, Sr. et al. | 208/11 |
| 2,885,339 | 5/1959 | Coulson et al. | 208/11 |
| 3,875,046 | 4/1975 | Rosenbloom | 208/11 |
| 4,108,760 | 8/1978 | Williams et al. | 208/11 LE |
| 4,189,376 | 2/1980 | Mitchell | 208/8 LE X |

OTHER PUBLICATIONS

*Supercritical Extraction of Coal–Update,* R. Maddocks, presented to AICHE, Nov. 1978, Miami, FL, pp. 3-3--3-4, FIG. 1.

Primary Examiner—Delbert E. Gantz

[57] ABSTRACT

A process for replacing a solution obtained for instance by exposing oil shale particles to the action of a solvent under supercritical conditions, by a solvent is provided for. The solid/solution mixture is extracted in a multitude of cross flow extractions such as to gradually replace the solution e.g. a bitumen solution, by the solvent, e.g. toluene. An apparatus for carrying out this process is also disclosed.

18 Claims, 3 Drawing Figures

SOLID LIQUID EXTRACTION

This invention relates to the extraction of soluble materials from solids containing such materials. More specifically, this invention relates to the extraction of organic material-containing solids such as oil shale.

BACKGROUND OF THE INVENTION

Various solid materials are known to contain hydrocarbons and the recovery of such hydrocarbons from such solids has attracted significant interest, particularly in recent years. Examples of such solid materials are oil shale, tar sands, coal and lignite. Various methods have already been proposed in the art to recover the organic materials from such solids. One such method that has been proposed is the so-called supercritical extraction, which allows recovery of a significant amount of the organic material contained in such solids. Supercritical extraction has been disclosed in particular for the recovery of organic materials from oil shale. Recovering a significant amount of the organic material of such solids as oil shale is a continuing goal in the industry.

THE INVENTION

It is one object of this invention to provide a process for extracting a solid particulate material containing extractable soluble products.

Another object of this invention is to provide a process for extracting organic products containing solids such as oil shale with a high degree of efficiency.

Still another object of this invention is to provide an apparatus for carrying out such an extraction process.

Yet a further object of this invention is to provide an apparatus for carrying out such an extraction process containing a minimum of moveable parts.

Figure 2:
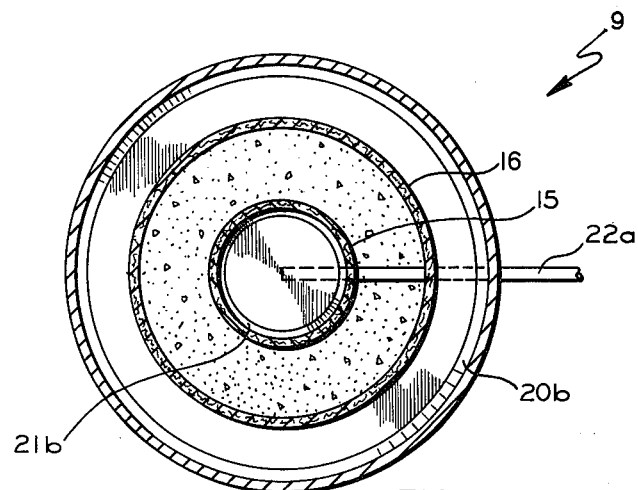
Figure 3:
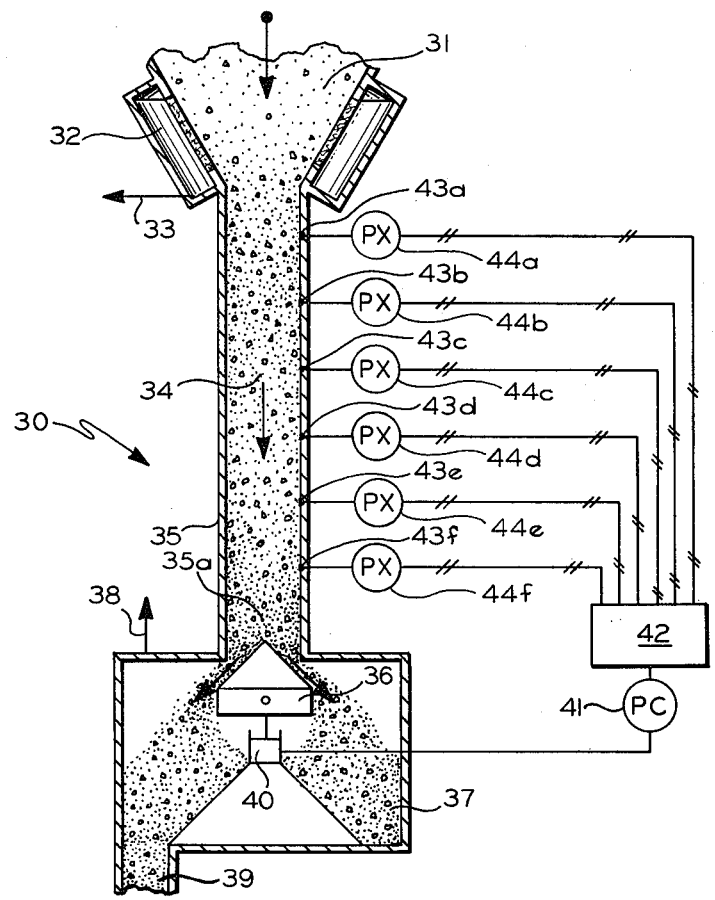

These and other objects, advantages, details, features and embodiments of this invention will become apparent to those skilled in the art from the following detailed description of the invention, the appended claims and the drawing in which:

FIGS. 1 and 2 show schematic cross-section of views of an apparatus of this invention and FIG. 3 shows a solids discharge apparatus.

In accordance with this invention a solids/liquid extraction process is provided for wherein a moving bed of solids is subjected to a sequence of flows of extraction fluids. More specifically, in accordance with a first embodiment of this invention there is provided an extraction process for extracting soluble and preferably organic products contained in a solid particulate material. The solid particulate material containing the extractable organic products is introduced into a housing and passed along a flow path established within this housing. The flow path contains a series of connected replacement zones within this housing. These zones are portions of the flow path and are interconnected in such a manner as to have essentially no obstruction within the entire flow path. The individual replacement zones thus are in open and fluid communication with each other. At each of the respective replacement zones a stream of an inlet fluid which comprises a significant amount of solvent for the extractable products is released into contact with the solid particulate material. After contact with and extraction of the solid particulate material, a stream of an outlet fluid comprising a significant amount of solvent and a larger amount of extracted product compared to the inlet fluid is withdrawn from the respective replacement section. Thereby in each section at least a portion of the fluid or respectively soluble products present in the solid particulate material entering the respective stage is replaced by the inlet fluid. The temperature and pressure conditions in the flow path are such that the pressure is essentially constant throughout the flow path. In a preferred embodiment, the temperature is in at least one of the replacement zones high enough to subject the solvent to supercritical conditions. At least one of the outlet streams is recovered as the product of the process. The solid particulate material which is depleted of extractable products is removed from the flow path.

In a presently preferred embodiment, the stream of outlet fluid from one replacement zone, or a portion thereof, is used as the stream of inlet fluid, or a portion thereof, for another replacement zone which is upstream with respect to the flowpath of the first replacement zone. This operation has the advantage that the repressurizing of the outlet fluid only has to overcome the pressure drop of the fluid across the bed of the solid particles in said path. A series of replacement zones can be connected in this way described; at least a portion of each outlet stream of one replacement zone then constitutes at least a portion of the inlet stream of the next upstream replacement zone of a series of replacement zones, the term "upstream" referring to the flow path of the solid particulate material. Such a series of replacement zones may comprise consecutive replacement zones within the flow path and preferably all of the replacement zones constitute one series. In this embodiment, there is one stream of fluid flowing through the solid material in each replacement zone, said stream becoming richer in extracted material in every zone and the last stream of outlet fluid from the first replacement zone is withdrawn as the product of the process. In these preferred embodiments, essentially the entire outlet stream of one replacement zone constitutes essentially the entire inlet stream of of the next upstream replacement zone of a series. The inlet stream for the last replacement zone can be and preferably will be essentially pure solvent. It is, however, within the scope of this invention to replace a portion of the outlet stream by another fluid in order to achieve a specific result such as a more efficient extraction. Thus, a small quantity of fresh solvent can be added to one or more of the outlet streams with a corresponding withdrawal of a certain quantity of these outlet streams for further processing.

The inlet streams are pumped into the individual replacement zones. Generally there will be provided one pumping means for each inlet stream. However, it is within the scope of this invention to use one pump to generate pressurized inlet fluid and to use this fluid for two or more replacement zones.

The solid particulate material that is preferably used in connection with this invention is selected from the group consisting of oil shale, tar sand, coal, lignite and mixture of two or more of these materials. The solid particles will preferably have a particle size in the range of $\frac{1}{4}$ inch to 5 microns.

Suitable solvents for the preferred supercritical extraction of the solid are extraneous and/or process-derived fluids. The extraneous solvents include ethylene, carbon dioxide, aromatic hydrocarbons having a single benzene ring and being unsubstituted or substituted with radicals containing 1-4 carbon atoms, substituted or unsubstituted cycloalkanes having 5-12 carbon atoms, substituted or unsubstituted aromatic hydrocarbons having 2 aromatic rings condensed or not and containing 10–18 carbon atoms, aliphatic hydrocarbons having 5–16 carbon atoms, and alcohols, aldehydes, ketones, esters and amines which are stable in the desired operating temperature range and which preferably can be maintained in the supercritical state under desired operating conditions (as defined in the following paragraph). Mixtures of such solvents can be employed. The presently preferred group of suitable extraneous solvents include ethylene, benzene, toluene, xylene, ethyl benzene, isopropyl benzene, tri- and tetramethyl benzenes and tetralin. The most preferred solvents are aromatics.

It is also within the scope of this invention and presently preferred that at least a portion of the "solvent" is a process-derived fluid. Such a process derived fluid may e.g. be a hydrocarbon mixture defined by a boiling range. The process derived fluid will generally be obtained by a distillation operation or a cracking and distillation operation carried out with the product solution or a portion thereof.

The supercritical extraction of the solids is carried out at a temperature above the critical temperature and pressure of the solvent. Generally, the conditions for supercritical extraction for the preferred solvents encompass temperatures in the range of about 350°–550° C. and pressures in the range of 550–3,000 psi. It is desirable to replace the rich fluid extract of, for instance, oil shale which has been subjected to supercritical extraction conditions with fresh solvent at high pressures and temperature to prevent the redeposition of the heavy organic material on the remaining solids.

It is particularly desirable for reasons of process economy to pass the mixture of solids and solvent leaving the flow path through a heat exchange relationship with a cooling fluid. Thereby, the solvent is cooled to a release temperature below the critical temperature. The mixture of solids and solvent is above the boiling temperature so that the solvent rapidly evaporates or flashes. The evaporated solvent and the remaining solids are readily separated and the solvent preferably is recycled into the replacement zones or into the supercritical extraction zone.

In the case of oil shale the organic material, the kerogen, is first made soluble or extractable. This can be done by heating the shale to a temperature at which the kerogen is converted to soluble or extractable carbonaceous or hydrocarbon compounds.

The heating can be part of the e.g. supercritical extraction or contacting step, or it can be done in a separate pretreating step.

In accordance with a second embodiment of this invention an apparatus for carrying out the process described is provided for. This apparatus comprises a housing composed of walls enclosing a flow path between an upstream end and a downstream end, which path comprises a series of unobstructedly connected replacement zones. At least portions of the walls in the replacement sections contain an inlet filter and an outlet filter. These filters comprise filter material allowing fluid-containing material (e.g. organic material) extracted from the solids to pass through but withholding the solid particles. A fluid inlet conduit is associated with each inlet filter and fluid outlet conduit is associated with each outlet filter. Although the "inlet filter" has a support but no real filtering function under normal operation, it is provided for particularly to maintain the plug flow of the solids and to permit flow reversal of the extracting fluid.

In the preferred embodiment of this apparatus the flow path is established as the space between the inner surface of an outer wall and the outer surface of an inner wall. Both of these surfaces are geometrically defined as areas which can be described mathematically as a general frustoconus or a general cylinder. These areas thus are established by a section of a straight line which is moved along a closed curve, the straight line either intersecting an axis in one point or being parallel thereto during this movement. Specific examples of such areas are frustoconically shaped areas and cylindrically shaped areas. Preferably, both the conically shaped and the cylindrically shaped areas confining the flow path are mentioned; thus these surfaces are of circular cross section. Most preferably the entire flow path comprising the replacement zones is defined by two frustums or two cylinders of different sizes having a common axis.

Consecutive lengths of the sections of the straight line mentioned above define ring-shaped consecutive portions of the inner wall and the outer wall confining the annular space. These ring-shaped portions of the inner wall and ring-shaped portions of the outer wall are at least in part made from filter material as described above. A ring-shaped chamber may surround each of the ring-shaped portions of the walls and each inlet conduit and each outlet conduit is connected to the respective ring-shaped chamber.

A staged countercurrent contactor is preferably used operating at high pressure but without moving parts in the high pressure region. The solids plus rich fluid enter at the top of the contactor and pass through an annulus created by a double conical section. Both the inner and outer walls of the annulus are made from filtering medium (e.g., sintered stainless steel), segmented to create stages. Fresh solvent enters the bottom stage through the outer medium, flows in cross-flow relationship to the flowing solids slurry in the annulus, is removed from the annulus through the inner medium, is withdrawn from the apparatus through a conduit, and re-used in the next higher stage with the assistance of a booster pump to restore the pressure. The pattern continues through e.g. seven stages.

Since the solids may build a cake on the filter medium and sometimes will do so rapidly when operated as described, two special operating regimes may be employed to solve this problem. In the first regime, the average solids velocity down the annulus is kept low compared to the velocity of the cross-flowing wash fluid. The result is the laydown in a short period of time of a thick filter cake which is counteracted by reversing the flow of fluids through the replacement zones from time to time, e.g. periodically, to backwash the filters.

The second operating regime employs a relatively thin annulus with a high length to thickness ratio (e.g., 20:1 to 10,000:1), with a resultant high slurry velocity (15 to 75 ft/sec) creating a scouring action to carry away the filter cake and limit its thickness. Both operating regimes may be combined and preferably are combined so that any unexpected buildup of filter cake in a narrow annulus can be readily loosened by counterflowing the replacement fluid through the replacement zone.

FIGS. 1 and 2 show two cross sectional views of the extractor of this invention together with a schematic representation of the overall process. The following description is made specifically with respect to the extraction of oil shale, but it is to be understood that the extraction method can be used in connection with other solids containing extractable, soluble materials. Crushed oil shale, preferably ground to a practical particle size is introduced via line 1 into a mixing zone 2. Solvent, e.g. toluene, is introduced via line 3 and the oil shale and the solvent are mixed in the mixing zone to form a slurry which via line 4 is passed to a pressurizing zone 5 in which the slurry is pressurized to a high pressure of e.g. 1500 psi. From the pressurizing zone 5 the slurry is passed via line 5 to a heating zone 6 wherein the slurry is brought to a temperature of about 700° to 900° F. The slurry remains under the high temperature and pressure conditions in contact with the solvent for a time in the range of 2 to 120 minutes, usually approximately 10 minutes. This time is not particularly critical and is determined more by commercial reasons than by technical requirements. In the absence of a preheating step of the oil shale, this time must be long enough to allow the decomposition of the kerogen to bitumen. The longer the oil shale is subjected to the supercritical conditions the higher the yield of recovered hydrocarbons will be.

From the heating zone 7 the slurry 8 is introduced into the extraction zone 9. The slurry in line 8 now contains solid particles as well as extractable organic material, particularly bitumen, which can be removed by an extraction process. This organic extractable material in the case of oil shale being used is the result of a conversion process of the kerogen in the oil shale having been subjected to the solvent under supercritical conditions. The dissolved decomposition products of kerogen are washed out by the solvent crossflow process of this invention.

The mixture described enters the top of the extraction zone 9 and flows through a tapering or frustoconically shaped annular channel 10. From the extractor 9 the extracted material which now comprises solids, solvent and organic material but which is significantly depleted of such organic material as bitumen as compared to the stream entering via line 8, is passed via line 11 into a heat exchanger 12 where the mixture by means of indirect heat exchange heats a fluid introduced via line 13 into the indirect heat exchanger 12. This fluid can for instance be fresh solvent used in the extractor 9. If the fluid in line 13 is fresh solvent to use in extractor 9, it would also be possible to put another stage or two on extractor 9 and run the cold solvent directly to such a bottom stage or stages and let it heat exchange by direct contact with the spent shale. From the heat exchanger 12 the cooled mixture of solids and solvent is withdrawn via line 14 and is recovered via a pressure reduction system. Such a pressure reduction system will be described in further detail in connection with FIG. 3.

The multistage extraction apparatus of this invention comprises a staged contactor adapted to the washing of fine, free filtering solids which is capable of being operated at high pressures. The contactor has no moving parts in the high pressure region. Macroscopically the contactor is shown in FIG. 1 to be operated in a countercurrent way. The individual contacting stage of the contactor exposes the mixture to be extracted with a replacement fluid essentially in a cross flow operation wherein the direction of flow of the mixture and the direction of flow of the replacement fluid are roughly at right angles.

The frustoconically shaped annulus 10 is confined between two also frustoconically shaped walls 15 and 16 made of filtering material. This filtering material can for instance be sintered stainless steel and the material can be segmented to create stages. Fresh solvent via line 17 is pumped by means of pump 18 and a four way valve 19 into the outer chamber 20 annularly surrounding the first extraction of replacement zone. The fresh fluid flows through the filter walls and the material to be extracted between those walls in a cross flow relationship to the flowing solids. The fluid leaves the annulus 10 in the first stage via the inner chamber 21 and is passed by means of line 22 and the four way valve 19 to the pump 18a for the next stage. Similarly, the fluid which is gradually enriched in every stage in the content of extractable organic materials is moved by means of pumps 18a–g through four way valves 19a–f, outer chambers 20a–f, the extractable material in the channel, inner chambers 21a–f and leaving the respective inner zones via lines 22a–f, macroscopically in a countercurrent flow until a fluid containing the highest content of organic material in the solvent is finally removed via line 23 from pump 18g.

Each pump 18, 18a–g is designed to be capable of restoring the pressure of the fluid injected into the annular space 10. Each pump thus only has to be capable of pressurizing the fluid to a pressure differential between the inlet and the outlet side of the pump which equals or slightly surpasses the pressure drop of the fluid across the annulus 10. It is possible, in accordance with this invention, to increase the flow some at each successive pump 18a, thereby increasing the slurry concentration as it proceeds down the cone.

The four way valves 19, 19a–f are designed to allow the reversal of the flow through the respective portion of the annulus 10. These valves 19, 19a–f are four way valves and the drawings schematically show the operation. Preferably the valves 19, 19a–f are turned to reverse the fluid flow simultaneously so that all the fluids either flow from the outside to the inside or from the inside to the outside of the annulus 10.

In the drawing, seven sequential replacement zones of channel 10 are shown. Preferably, the number of replacement zones is between 3 and 12.

FIG. 3 schematically shows a cross section of the discharge zone 30. The material from the extraction zone enters a filter area 31 where any excess fluid is removed via an annular channel 32 and line 33. The solid material leaving the filter zone 31 is rather tightly packed bed 34. The only remaining fluid between the solid particles is that in the empty spaces between the solid particles of this bed. The bed moves through a conduit 35 having a large length/diameter ratio, for instance in the range of 20:1 to 1000:1. The solid particle bed is allowed to move slowly down the length of the conduit 35 and to discharge against and to be restrained by a moveable plug 36. The pressure drop from the high pressure region 31 to atmospheric pressure is thereby largely dissipated by the frictional resistance of the bed structure against the walls of the conduit 35. The remaining part of the pressure drop to be dissipated as released by the frictional contact of the bed structure against the moveable plug 36.

The temperature of the mixture leaving the pressure drop channel 35 is preferably above the boiling point of the solvent used so that the release of the mixture across plug 36 into the discharge chamber 37 causes flashing of the solvent. The evaporated solvent is removed via line 38 and the collected solids are withdrawn from the separating chamber via conduit 39.

The evaporated solvent in line 38, preferably after heat exchange, is recycled as a liquid into the extraction step of line 17 or to line 3 for use as supercritical extraction solvent.

The moveable plug 36 is manipulated through a hydraulic cylinder and piston unit 40. The hydraulic piston in turn is controlled in its motion from a pressure controller 41. The pressure controller 41 is operated by means of a sensing and control system 42 which receives as input signals those signals representative of preferably a plurality of pressures sensed along the length of the discharge conduit 35. The pressure sensing units are indicated in the drawing by reference numeral 43a–f and pressure transducers 44a–44f may be present if desired. The moveable plug 36 is manipulated by the sensing and control system 42 in such a way as to prevent any blowout of the moving bed of solid particles. The moveable plug 36 as well as the hydraulic system 40 as a security measure would have the capability of withstanding the pressure present in filter zone 31, e.g. 1500 psig. Normally the plug 36 would operate against a much smaller pressure, however.

Some fluid will flow from the high pressure zone 31 through the particulate material in channel 35 and out into the release chamber 37, thus losing the high pressure required in its upstream applications. The quantity of such fluid flowing directly through the release channel depends upon the flow resistance the fluid sees during the travel through the channel 35. Therefore, the release system described is particularly desirable in the case of small particle size solids wherein the permeability to fluid flow is low and correspondingly the resistance to said flow is high. Spent oil shale is usually of a particle size where this type of discharge system will be desirable.

The conduit 35 may be slightly tapered for improved frictional contact of the bed with the conduit or better bed structure characteristics. The conduit 35 may also be a continuation of the filter medium for additional fluids removal. It is also within the scope of this invention to control the removal of the fluids by a constant restriction for primary control of the bed flow rate, with only back up control provided by plug 36.

The following is a calculated example showing typical operating conditions.

EXAMPLE

The following figures are based on a feed rate of 10,000 lbs/hr of oil shale. In an actual plant producing 100,000 B/D of shale oil this feed rate will be in the order of 13,000,000 lbs/hr.

1. Feed of solids and rich fluid (extract) (line 8) 20,000 lb/hr, 710° F., 1500 psia
   Composition:
   oil shale 8700 lb/hr (−) 8 mesh;
   solvent 10,000 lb/hr;
   extract 1300 lb/hr
2. High pressure staged countercurrent contactor (annulus 10):
   upper section 710° F., 1500 psia;
   lower section 210° F., 1450 psia
3. Solvent and extract separated and recovered from oil shale (line 23)
   13,900 lb/hr, 700° F., 1500 psia;
   solvent 12,700 lb/hr;
   extract 1200 lb/hr
4. Fresh solvent (line 17)
   11,300 lb/hr, 120° F., 14.7 psia (on suction side of pump)
5. Washed solids, solvent and extract withdrawn from contactor (line 11)
   17,400 lb/hr, 210° F., 1450 psia;
   Washed solids:
   oil shale 8700 lb/hr;
   solvent 8600 lb/hr;
   extract 100 lb/hr
6. Dimensions of contactor 10:
   Outer annular entry diameter 18″
   Inner annular entry diameter 12″
   Outer annular exit diameter 15″
   Inner annular exit diameter 10″
   Conical section length 25′

Reasonable variations and modification which will become apparent to those skilled in the art can be made in this invention without departing from the spirit and scope thereof.

I claim:

1. An extraction process comprising
   (a) introducing a mixture of solid particulate material and extractable products into a housing,
   (b) passing said mixture in a plug flow manner along a flow path through a series of connected replacement zones in said housing, wherein these zones are portions of the flow path and are interconnected in such a manner as to have essentially no obstruction within the entire flow path,
   (c) releasing at each of the respective replacement zones a stream of an inlet fluid into contact with said mixture, said inlet fluid comprising a significant amount of solvent capable of replacing at least a portion of said product present in said mixture,
   (d) passing said inlet fluid through said solid material in a cross-flow direction with respect to the flow direction of the mixture,
   (e) withdrawing from each replacement zone a stream of an outlet fluid comprising a significant amount of solvent and a larger amount of extracted products compared to said inlet fluid, thereby replacing in each replacement zone at least a portion of the fluid and/or extractable products present in said mixture entering the respective replacement zone, by said inlet fluid,
   (f) recovering at least one of said outlet streams as the product of the process, and
   (g) withdrawing a mixture comprising solid particulate material and solvent but being depleted of extractable products from said housing.

2. A process in accordance with claim 1 wherein the outlet fluid of one replacement zone is the inlet fluid of another replacement zone upstream of said replacement zone, the term upstream referring to the flow of said mixture in said flow path.

3. A process in accordance with claim 2 wherein in a series of replacement zones, at least a portion of the outlet stream of one replacement zone constitutes at least a portion of the inlet stream of the next upstream replacement zone of said series.

4. A process in accordance with claim 3 wherein said series of replacement zones comprises consecutive replacement zones in said flow path.

5. A process in accordance with claim 4 wherein all of said replacement zones constitute one series.

6. A process in accordance with claim 4 wherein essentially the entire outlet stream of one replacement zone constitutes essentially the entire inlet stream of said next upstream replacement zone in said series.

7. A process in accordance with claim 4 wherein said inlet stream is pumped into said replacement zone.

8. A process in accordance with claim 1 wherein said flow path is established by the space between the inner surface of an outer wall and the outer surface of an inner wall, both of said surfaces being geometrically defined as established by the area in which a section of a straight line is moved along a closed curve which straight line during this movement either intersects an axis in one point or is parallel to said axis.

9. A process in accordance with claim 8 where both said inner and said outer surface are frustoconically shaped.

10. A process in accordance with claim 8 wherein at least one of said inner and said outer surfaces is cylindrically shaped.

11. A process in accordance with claim 10 wherein said cylindrically shaped surface or surfaces has or have the shape of a circular cylinder.

12. A process in accordance with claim 8 wherein the space between the inner surface and the outer surface which is surrounding said inner surface has a cross sectional area which measured orthogonally to the axis becomes gradually smaller in the direction of the flow of the mixture in said space.

13. A process in accordance with claim 8 wherein consecutive lengths of said section define consecutive ring-shaped portions of said inner wall and consecutive ring-shaped portions of said outer wall.

14. A process in accordance with claim 1 comprising reversing the flow of fluid in the individual replacement section.

15. A process in accordance with claim 8 wherein a mixture of said solids and said solvent leaving said flow path is passed through heat exchange means with a cooling fluid, thereby cooling said solvents to a release temperature above the boiling point of said solvent at the release pressure, and wherein the pressure of said mixture is then reduced to said release pressure, thus evaporating solvent in said mixture, and wherein the so evaporated solvent and the remaining solids are separated.

16. A process in accordance with claim 1 wherein the direction of fluid flow from the inlet fluid to the outlet fluid is essentially orthogonal to said flow path of the solid particulate material.

17. A process for the supercritical extraction of a mixture of solid particulate material and supercritically extractable liquid products and a solvent comprising
 (a) introducing said mixture into a housing and subjecting said mixture to supercritical extraction conditions for a time sufficient to alter and/or dissolve at least a significant portion of said supercritically extractable organic products in said solvent such as to form a mixture of said solid particulate material and a fluid comprising said solvent and the organic material resulting from the exposure of said organic products to the supercritical conditions,
 (b) maintaining said supercritical conditions for a time long enough to achieve the desired supercritical extraction,
 (c) passing the mixture from the supercritical extraction step in a plug flow manner along a flow path in a housing through a series of connected replacement zones, wherein these zones are portions of the flow path and are interconnected in such a manner as to have essentially no obstruction within the entire flow path,
 (d) releasing at each of the respective replacement zones a stream of inlet fluid comprising a significant amount of solvent capable of dissolving or replacing said fluid containing the organic material present in said mixture,
 (e) passing said inlet fluid through said solid material in a cross-flow direction with respect to the flow direction of the mixture,
 (f) withdrawing from said replacement zone a stream of an outlet fluid comprising a significant amount of solvent and a larger amount of organic material compared to said inlet fluid, thereby replacing in each replacement zone at least a portion of the fluid and/or organic material present in said mixture entering the respective replacement zone, by said inlet fluid,
 (g) recovering at least one of said outlet streams as the product of the process, and
 (h) withdrawing a mixture comprising solid particulate material and solvent being depleted of extractable organic products from the last of said replacement zones.

18. A process in accordance with claim 17 wherein a slurry of particulate oil shale and a solvent is subjected to said supercritical conditions.

* * * * *